US012597273B1

(12) United States Patent
Kim et al.

(10) Patent No.: US 12,597,273 B1
(45) Date of Patent: Apr. 7, 2026

(54) METHOD FOR PROVIDING AUTO LABELING SERVICE TO GENERATE TRAINING DATA AND SERVER USING THE SAME

(71) Applicant: StradVision, Inc., Pohang-si (KR)

(72) Inventors: Insu Kim, Pohang-si (KR); Mansoo Kim, Seongnam-si (KR); Seongwon Choi, Incheon (KR); Seongung Yun, Seoul (KR)

(73) Assignee: StradVision, Inc., Pohang-si (KR)

( * ) Notice: Subject to any disclaimer, the term of this patent is extended or adjusted under 35 U.S.C. 154(b) by 0 days.

(21) Appl. No.: 19/090,653

(22) Filed: Mar. 26, 2025

(30) Foreign Application Priority Data

Dec. 30, 2024 (KR) ........................ 10-2024-0201397

(51) Int. Cl.
| | |
|---|---|
| *G06V 20/56* | (2022.01) |
| *G06T 7/12* | (2017.01) |
| *G06T 7/13* | (2017.01) |
| *G06V 10/762* | (2022.01) |
| *G06V 10/771* | (2022.01) |
| *G06V 20/70* | (2022.01) |

(52) U.S. Cl.
CPC .............. *G06V 20/588* (2022.01); *G06T 7/12* (2017.01); *G06T 7/13* (2017.01); *G06V 10/762* (2022.01); *G06V 10/771* (2022.01); *G06V 20/70* (2022.01)

(58) Field of Classification Search
None
See application file for complete search history.

(56) References Cited

U.S. PATENT DOCUMENTS

| | | | | |
|---|---|---|---|---|
| 5,566,288 A | * | 10/1996 | Koerhsen | ................ G06F 17/17 |
| | | | | 345/442 |
| 12,325,426 B2 | * | 6/2025 | Baid | ..................... B60W 50/14 |
| 2019/0187707 A1 | | 6/2019 | Zheng | |

(Continued)

FOREIGN PATENT DOCUMENTS

KR        1020200060194 A        5/2020

OTHER PUBLICATIONS

European Extended Search Report dated Sep. 16, 2025 in Connection with Application No. 25167368.7.

(Continued)

*Primary Examiner* — James M Anderson, II
(74) *Attorney, Agent, or Firm* — Eschweiler & Potashnik, LLC

(57) ABSTRACT

A method for providing auto labeling assistance service is disclosed. The method includes steps of: (a) providing a labeling interface to a labeler terminal, to thereby cause a labeler to select a specific lane detection model suitable for a target image among a first lane detection model to an n-th lane detection model by referring to at least one lane detection result among a first lane detection result to an n-th lane detection result, by the labeling interface displayed on the labeler terminal; and (b) in response to acquiring first point information to k-th point information on a specific lane selected to label the specific lane among lanes located in the target image, causing a semi-auto labeling module to generate a first spline model having m spline points corresponding to the specific lane and to display the first spline model, to thereby provide the auto labeling assistance service.

20 Claims, 12 Drawing Sheets

(56) References Cited

U.S. PATENT DOCUMENTS

2021/0342600 A1*  11/2021  Westmacott  ........  G06F 18/2148
2024/0177498 A1*   5/2024  Pittner  .................  G06V 10/774

OTHER PUBLICATIONS

He Zhonghe et al: "Lane Attribute Classification Based on Fine-Grained Description", SENSORS, vol. 24, No. 15, Jul. 24, 2024 (Jul. 24, 2024), pp. 1-24, XP093308846, CH ISSN: 1424-8220, DOI: 10.3390/s24154800 * the whole document *.

* cited by examiner

FIG. 2

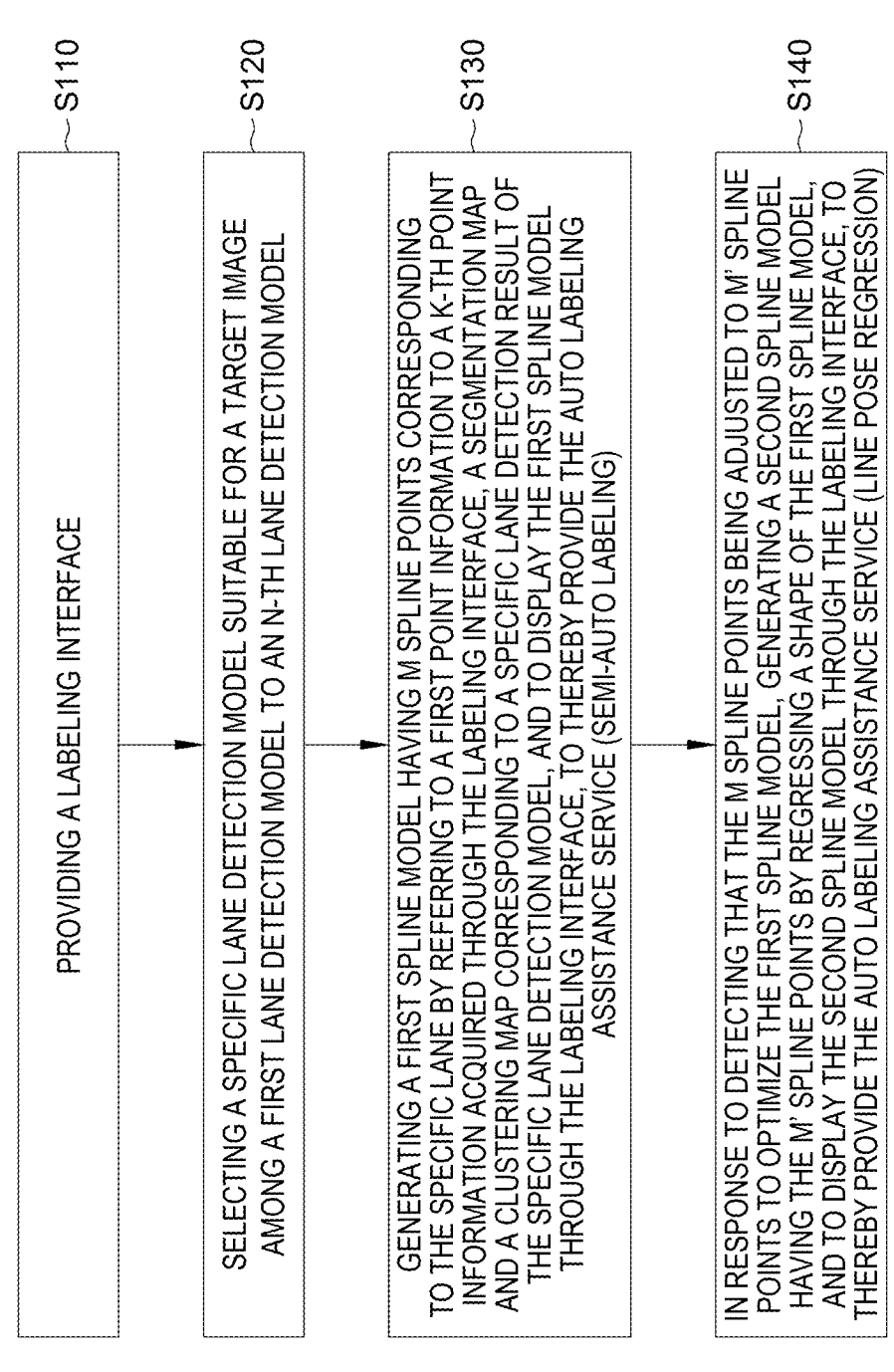

PROVIDING A LABELING INTERFACE ⌒S110

SELECTING A SPECIFIC LANE DETECTION MODEL SUITABLE FOR A TARGET IMAGE AMONG A FIRST LANE DETECTION MODEL TO AN N-TH LANE DETECTION MODEL ⌒S120

GENERATING A FIRST SPLINE MODEL HAVING M SPLINE POINTS CORRESPONDING TO THE SPECIFIC LANE BY REFERRING TO A FIRST POINT INFORMATION TO A K-TH POINT INFORMATION ACQUIRED THROUGH THE LABELING INTERFACE, A SEGMENTATION MAP AND A CLUSTERING MAP CORRESPONDING TO A SPECIFIC LANE DETECTION RESULT OF THE SPECIFIC LANE DETECTION MODEL, AND TO DISPLAY THE FIRST SPLINE MODEL THROUGH THE LABELING INTERFACE, TO THEREBY PROVIDE THE AUTO LABELING ASSISTANCE SERVICE (SEMI-AUTO LABELING) ⌒S130

IN RESPONSE TO DETECTING THAT THE M SPLINE POINTS BEING ADJUSTED TO M' SPLINE POINTS TO OPTIMIZE THE FIRST SPLINE MODEL, GENERATING A SECOND SPLINE MODEL HAVING THE M' SPLINE POINTS BY REGRESSING A SHAPE OF THE FIRST SPLINE MODEL, AND TO DISPLAY THE SECOND SPLINE MODEL THROUGH THE LABELING INTERFACE, TO THEREBY PROVIDE THE AUTO LABELING ASSISTANCE SERVICE (LINE POSE REGRESSION) ⌒S140

METHOD FOR PROVIDING AUTO LABELING SERVICE TO GENERATE TRAINING DATA AND SERVER USING THE SAME

CROSS REFERENCE OF RELATED APPLICATION

This present application claims the benefit of the earlier filing date of Korean patent application No. 10-2024-0201397, filed on Dec. 30, 2024, the entire contents of which being incorporated herein by reference.

TECHNICAL FIELD

The present disclosure relates to a method for providing auto labeling assistance service to generate training data and a server using the same.

BACKGROUND

Technologies that utilize artificial intelligence are being developed and used across industries, and training of the artificial intelligence models, such as deep learning models, is essential to utilize the artificial intelligence.

A large amount of training data is required for training the artificial intelligence models. In order to obtain training data, raw data and labeling information for the raw data are required.

Since labeling tasks should be performed by a labeler, institutes that research or develop the artificial intelligence often have labelers who perform the labeling tasks.

However, since the labeling tasks can be performed by anyone without any specialized knowledge in many cases, platforms that distribute data to multiple workers through the internet and pay the workers for the labeling tasks have appeared to reduce labor costs. For example, Mechanical Turk of Amazon has appeared as a platform.

On the other hand, the labeling tasks for generating the training data require the labelers to manually check each of the raw data, such as images, which is time-consuming and does not ensure uniform quality of labeling results.

In particular, there are differences in labeling proficiencies among the labelers, resulting in a disadvantage of not only incurring differences in speed of performing the labeling tasks for the same data but also incurring differences in the quality of the labeling results.

Further, when the same labeler performs the labeling tasks, there are disadvantages of not only the difference in the speed of each of the labeling tasks by training data but also the difference in the quality of each of the labeling results for each of the labeling tasks by training data.

SUMMARY

It is an object of the present disclosure to solve all the aforementioned problems.

It is another object of the present disclosure to reduce time taken to perform labeling tasks for generating training data and improve quality of the labeling tasks, through an interaction with a labeler.

It is still another object of the present disclosure to minimize the differences in speed of the labeling tasks and the quality of the labeling tasks among labelers.

It is still yet another object of the present disclosure to minimize the differences in the speed of the labeling tasks and the quality of the labeling tasks among training data.

In accordance with one aspect of the present disclosure, there is provided a method for providing auto labeling assistance service to generate training data, comprising steps of: (a) in response to acquiring information on a request for the auto labeling assistance service from a labeler terminal, providing, by a server, a labeling interface to the labeler terminal, to thereby allow a labeler to select a specific lane detection model suitable for a target image among a first lane detection model to an n-th lane detection model by referring to at least one lane detection result among a first lane detection result to an n-th lane detection result, by the labeling interface displayed on the labeler terminal, wherein the first lane detection result to the n-th lane detection result are respectively acquired by applying the first lane detection model to the n-th lane detection model respectively to the target image, and wherein n is an integer equal to or larger than 1; and (b) in response to acquiring first point information to k-th point information on a specific lane selected to label the specific lane among one or more lanes located in the target image through the labeling interface, allowing, by the server, a semi-auto labeling module to generate a first spline model having m spline points corresponding to the specific lane in the target image by referring to at least part of the first point information to the k-th point information acquired through the labeling interface, a segmentation map and a clustering map corresponding to a specific lane detection result of the specific lane detection model, and to display the first spline model through the labeling interface, to thereby provide the auto labeling assistance service, wherein k is an integer larger than or equal to 2, and m is an integer larger than or equal to 2.

As one example, further comprising a step of: (c) in response to detecting that the m spline points for the first spline model are adjusted to m' spline points by the labeler to optimize the first spline model displayed through the labeling interface, allowing, by the server, a line pose regression module to generate a second spline model having the m' spline points by regressing a shape of the first spline model and display the second spline model through labeling interface, to thereby provide the auto labeling assistance service, wherein m' is an integer larger or smaller than m.

As another example, at the step of (c), the server allows the line pose regression module to optimize, through a meta-heuristic optimization algorithm, pose coefficients of the first spline model and width coefficients of the first spline model at each of the m' spline points, by referring to at least part of an edge map, a gradient map and a magnitude map corresponding to the target image, to thereby generate the second spline model which is localized to the target image.

As another example, the server allows the line pose regression module to generate, through a Nelder-Mead algorithm which is the meta-heuristic optimization algorithm, each piece of optimized position information and each of optimized spline widths for each of the m' spline points on a parameter map which refers to at least part of the edge map, the gradient map and the magnitude map, and wherein each of the m' spline points follows function values that minimize cubic polynomial coefficients according to a pose of the first spline model and a linear polynomial coefficient according to a spline width of the first spline model.

As another example, at the step of (b), the server allows the semi-auto labeling module to (i) cluster edges of one or more lane segments for the specific lane of the target image using a feature map generated by referring to at least part of the segmentation map and the clustering map, wherein the edges represent at least part of both ends of lane directions in the lane segments, (ii) generate at least two anchor points for connecting the lane segments, (iii) generate a graphical model for connecting the lane segments, (iv) determine an optimal path for connecting the lane segments by referring to the graphical model and (v) determine the m spline points and their corresponding m spline widths for generating splines for the lane segments through the meta-heuristic algorithm, to thereby generate the first spline model having the m spline points.

As another example, the server allows the semi-auto labeling module to determine the optimal path according to connection scores of the lane segments in the graphical model by using an A* algorithm when the semi-auto labeling module (iv) determines the optimal path for connecting the lane segments by referring to the graphical model.

As another example, the server allows the semi-auto labeling module to determine the m spline points and the m spline widths by using a firefly algorithm as the meta-heuristic algorithm when the semi-auto labeling module (v) determines the m spline points and their corresponding m spline widths for generating the splines for the lane segments through the meta-heuristic algorithm.

As another example, at the step of (a), the server overlays each of the first lane detection result corresponding to the first lane detection model to the n-th lane detection result corresponding to the n-th lane detection model on the target image through the labeling interface, to thereby allow the labeler to be provided with each of the first lane detection result to the n-th lane detection result, and allow the labeler to select the specific lane detection model according to the specific lane detection result suitable for the target image.

As another example, each of the first lane detection model to the n-th lane detection model includes at least part of: a cat's eye lane detection model, a zigzag lane detection model, a double-lane detection model, a general lane detection model, a merge/branch lane detection model and an intersection lane detection model.

As another example, the segmentation map is a map generated by performing segmentation process on one or more lanes detected from the target image through the specific lane detection model, and wherein the clustering map is a map generated by performing clustering process on the one or more lanes based on whether there are identical lanes among the one or more lanes.

In accordance with another aspect of the present disclosure, there is provided a server for providing auto labeling assistance service to generate training data, comprising: at least one memory that stores instructions; and at least one processor configured to execute the instructions to perform processes of: (I) in response to acquiring information on a request for the auto labeling assistance service from a labeler terminal, providing a labeling interface to the labeler terminal, to thereby allow a labeler to select a specific lane detection model suitable for a target image among a first lane detection model to an n-th lane detection model by referring to at least one lane detection result among a first lane detection result to an n-th lane detection result, by the labeling interface displayed on the labeler terminal, wherein the first lane detection result to the n-th lane detection result are respectively acquired by applying the first lane detection model to the n-th lane detection model respectively to the target image, and wherein n is an integer equal to or larger than 1; and (II) in response to acquiring first point information to k-th point information on a specific lane selected to label the specific lane among one or more lanes located in the target image through the labeling interface, allowing a semi-auto labeling module to generate a first spline model having m spline points corresponding to the specific lane in the target image by referring to at least part of the first point information to the k-th point information acquired through the labeling interface, a segmentation map and a clustering map corresponding to a specific lane detection result of the specific lane detection model, and to display the first spline model through the labeling interface, to thereby provide the auto labeling assistance service, wherein k is an integer larger than or equal to 2, and m is an integer larger than or equal to 2.

As another example, further comprising a process of: (III) in response to detecting that the m spline points for the first spline model are adjusted to m' spline points by the labeler to optimize the first spline model displayed through the labeling interface, allowing a line pose regression module to generate a second spline model having the m' spline points by regressing a shape of the first spline model and display the second spline model through the labeling interface, to thereby provide the auto labeling assistance service, wherein m' is an integer larger or smaller than m.

As another example, at the process of (III), the processor allows the line pose regression module to optimize, through a meta-heuristic optimization algorithm, pose coefficients of the first spline model and width coefficients of the first spline model at each of the m' spline points, by referring to at least part of an edge map, a gradient map and a magnitude map corresponding to the target image, to thereby generate the second spline model which is localized to the target image.

As another example, the processor allows the line pose regression module to generate, through a Nelder-Mead algorithm which is the meta-heuristic optimization algorithm, each piece of optimized position information and each of optimized spline widths for each of the m' spline points on a parameter map which refers to at least part of the edge map, the gradient map and the magnitude map, and wherein each of the m' spline points follows function values that minimize cubic polynomial coefficients according to a pose of the first spline model and a linear polynomial coefficient according to a spline width of the first spline model.

As another example, at the process of (II), the processor allows the semi-auto labeling module to (i) cluster edges of one or more lane segments for the specific lane of the target image using a feature map generated by referring to at least part of the segmentation map and the clustering map, wherein the edges represent at least part of both ends of lane directions in the lane segments, (ii) generate at least two anchor points for connecting the lane segments, (iii) generate a graphical model for connecting the lane segments, (iv) determine an optimal path for connecting the lane segments by referring to the graphical model and (v) determine the m spline points and their corresponding m spline widths for generating splines for the lane segments through the meta-heuristic algorithm, to thereby generate the first spline model having the m spline points.

As another example, the processor allows the semi-auto labeling module to determine the optimal path according to connection scores of the lane segments in the graphical model by using an A* algorithm when the semi-auto labeling module (iv) determines the optimal path for connecting the lane segments by referring to the graphical model.

As another example, the processor allows the semi-auto labeling module to determine the m spline points and the m spline widths by using a firefly algorithm as the meta-heuristic algorithm when the semi-auto labeling module (v) determines the m spline points and their corresponding m spline widths for generating the splines for the lane segments through the meta-heuristic algorithm.

As another example, at the process of (I), the processor overlays each of the first lane detection result corresponding to the first lane detection model to the n-th lane detection result corresponding to the n-th lane detection model on the target image through the labeling interface, to thereby allow the labeler to be provided with each of the first lane detection result to the n-th lane detection result, and allow the labeler to select the specific lane detection model according to the specific lane detection result suitable for the target image.

As another example, each of the first lane detection model to the n-th lane detection model includes at least part of: a cat's eye lane detection model, a zigzag lane detection model, a double-lane detection model, a general lane detection model, a merge/branch lane detection model and an intersection lane detection model.

As another example, the segmentation map is a map generated by performing segmentation process on one or more lanes detected from the target image through the specific lane detection model, and wherein the clustering map is a map generated by performing clustering process on the one or more lanes based on whether there are identical lanes among the one or more lanes.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

FIG. 2 is a drawing schematically illustrating a method for providing the auto labeling assistance service to generate the training data in accordance with one example embodiment of the present disclosure.

DETAILED DESCRIPTION

Figure 1:
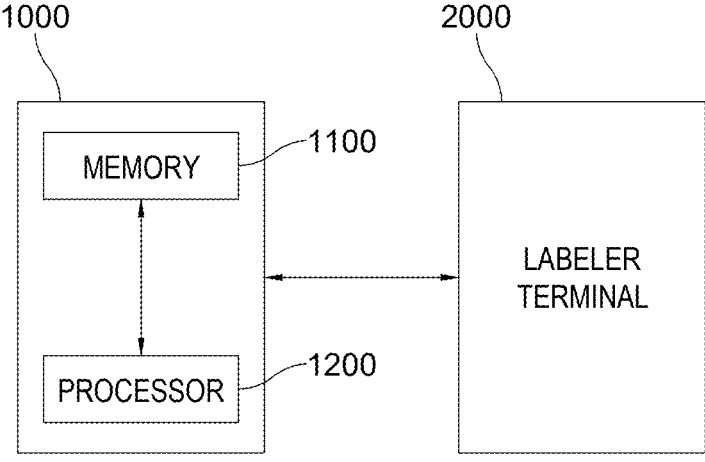
FIG. 1 is a drawing schematically illustrating a server for providing an auto labeling assistance service to generate training data in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

FIG. 1 is a drawing schematically illustrating a server for providing an auto labeling assistance service to generate training data. As shown in FIG. 1, the server 1000 may include a memory 1100 that stores instructions for providing the auto labeling assistance service to generate the training data and a processor 1200 configured to perform operations for providing the auto labeling assistance service to generate the training data according to the instructions stored in the memory 1100.

Specifically, the server 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor 1200 of the server 1000 may include a hardware configuration of MPU (Micro Processing Unit) or CPU (Central Processing Unit), cache memory, data bus, etc. Additionally, the computing device may further include OS and software configuration of applications that achieve specific purposes.

However, a case in which the server 1000 includes an integrated processor having a medium, a processor and a memory therein for carrying out the present disclosure is not excluded.

Meanwhile, the processor 1200 of the server 1000 is configured to execute the instructions stored in the memory 1100, wherein, according to the instructions, the processor 1200 may perform a process of: in response to acquiring information on a request for the auto labeling assistance service from a labeler terminal, providing a labeling interface to the labeler terminal, to thereby allow a labeler to select a specific lane detection model suitable for a target image among a first lane detection model to an n-th lane detection model, which is/are at least one lane detection model, by referring to at least one lane detection result among a first lane detection result to an n-th lane detection result, by the labeling interface displayed on the labeler terminal. Herein the first lane detection result to the n-th lane detection result are respectively acquired by applying the first lane detection model to the n-th lane detection model respectively to the target image. Further, the processor 1200 may perform a process of: in response to acquiring first point information to k-th point information, which are two or more pieces of point information, on a specific lane selected to label the specific lane among one or more lanes located in the target image through the labeling interface, allowing a semi-auto labeling module to generate a first spline model having m spline points, which are two or more spline points, corresponding to the specific lane in the target image by referring to at least part of the first point information to the k-th point information acquired through the labeling interface, a segmentation map and a clustering map corresponding to a specific lane detection result of the specific lane detection model, and to display the first spline model through the labeling interface, to thereby provide the auto labeling assistance service.

Furthermore, the server 1000 may perform a process of: in response to detecting that the m spline points for the first spline model are adjusted to m' spline points, wherein m' is an integer larger or smaller than m, by the labeler to optimize the first spline model displayed through the labeling interface, allowing a line pose regression module to generate a second spline model having the m' spline points by regressing a shape of the first spline model and display the second spline model through the labeling interface, to thereby provide the auto labeling assistance service.

Meanwhile, a single labeler terminal 2000 is shown in FIG. 1, but this is for convenience of the explanation. Thus, multiple labeler terminals may allow multiple labelers to perform labeling tasks through the multiple labeler terminals by using the auto labeling assistance service.

The method for providing the auto labeling assistance service to generate the training data at the server 1000 as configured above can be described by referring to FIG. 2 as below.

First, in response to acquiring information on a request for the auto labeling assistance service from the labeler terminal 2000, the server 1000 may provide a labeling interface to the labeler terminal 2000 at a step of S110.

Accordingly, the server 1000 may allow a labeler to select a specific lane detection model suitable for a target image among a first lane detection model to an n-th lane detection model, which is/are at least one lane detection model, by referring to at least one lane detection result among a first lane detection result to an n-th lane detection result, through the labeling interface displayed on the labeler terminal. Herein the first lane detection result to the n-th lane detection result are respectively acquired by applying the first lane detection model to the n-th lane detection model respectively to the target image at a step of S120.

Figure 3:
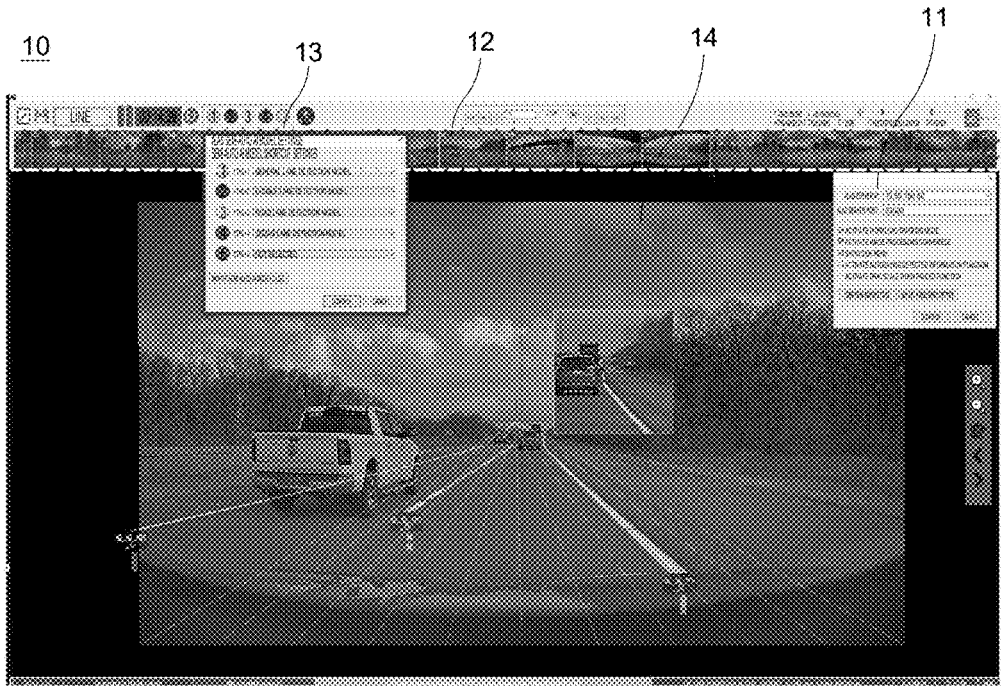
FIG. 3 is a drawing schematically illustrating an example of a labeling interface provided to a labeler terminal in a method for providing the auto labeling assistance service to generate the training data in accordance with one example embodiment of the present disclosure.

As an example, referring to FIG. 3, the labeling interface 10 may include a settings menu 11, a target image selecting menu 12, a lane detection model selecting menu 13 and a display region 14.

The labeler may set a labeling task environment through the settings menu 11 of the labeling interface 1, which is displayed on the labeler terminal. In response to acquiring labeler information through the settings menu 11 of the labeling interface, the server 1000 may obtain an image set for labeling tasks corresponding to the labeler information from a database (now shown), to thereby provide a list regarding the image set on the target image selecting menu 12. Herein, the server 1000 may allow the target image selecting menu 12 to display the images included in the image set in a listed form, or display thumbnails of the images. Thereafter, the labeler may select a target image to be used for performing a current labeling task from the target image selecting menu 12 of the labeling interface 10.

Accordingly, the server 1000 may allow the target image selected by the labeler to be displayed on the display region 14 of the labeling interface.

Also, the first lane detection model to the n-th lane detection model may be provided through the lane detection model selecting menu 13 of the labeling interface 10. Then, the labeler may apply each of the first lane detection model to the n-th lane detection model to the target image, to thereby select a specific lane detection model suitable for the target image. Herein, the labeler may select the specific lane detection model which is a lane detection model expected to be suitable for the target image, through respective model names of the first lane detection model to the n-th lane detection model, or repeating the process of applying any lane detection model among the first lane detection model to the n-th lane detection model to the target image, to thereby select the specific lane detection model suitable for the target image, wherein the specific lane detection model suitable for the target image may be selected before applying every lane detection model, that is, each of the n lane detection models. In addition, although the number of the lane detection model provided through the lane detection selecting menu 13 is assumed to be n, the number of the lane detection model provided through the lane detection selecting menu 13 may be n' which is larger than n, wherein the n lane detection models may be selected among n' lane detection models in this case.

That is, the server 100 may overlay each of the first lane detection result corresponding to the first lane detection model to the n-th lane detection result corresponding to the n-th lane detection model to the target image displayed on the display region 14 through the labeling interface 10, to thereby allow the labeler to be provided with each of the first lane detection result to the n-th lane detection result, and allow the labeler to select the specific lane detection model corresponding to the specific lane detection result suitable for the target image.

Herein, each of the first lane detection model to the n-th lane detection model may be each of lane detectors which detects lanes on an image based on a deep learning network (s), and the first lane detection model to the n-th lane detection model may include at least part of: a cat's eye lane detection model, a zigzag lane detection model, a double-lane detection model, a general lane detection model, a merge/branch lane detection model and an intersection lane detection model.

Figure 4A:
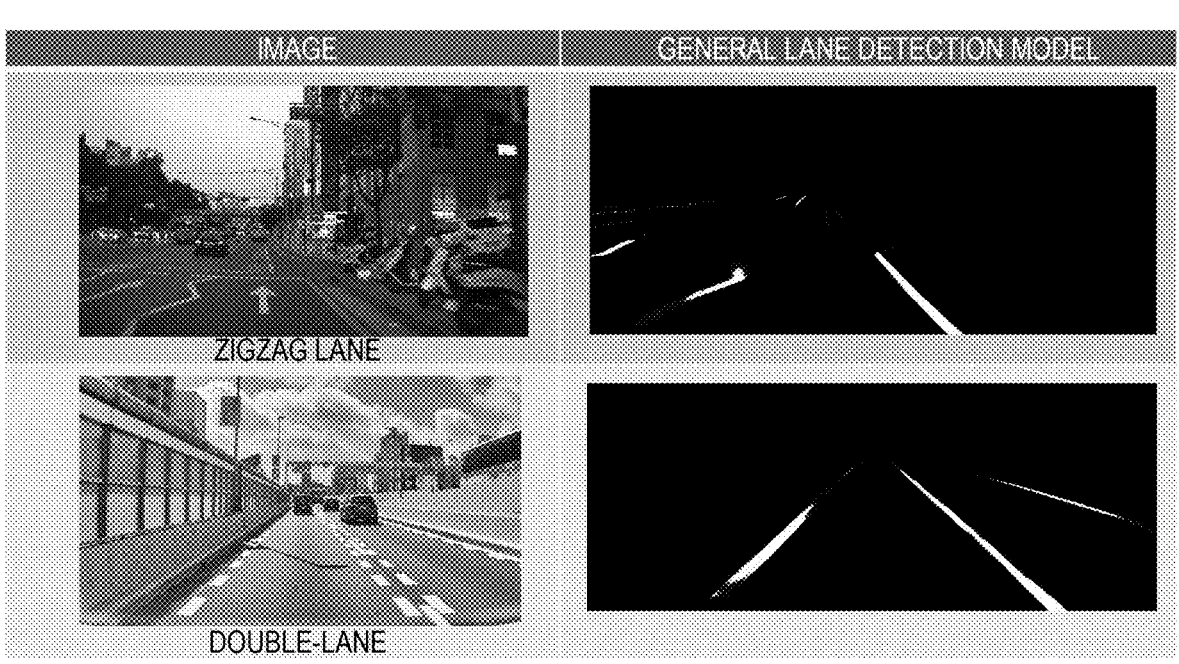
FIG. 4A is a drawing schematically illustrating a result of lane detection using a general lane detection model, in different lane environments, according to a conventional technology.
Figure 4B:
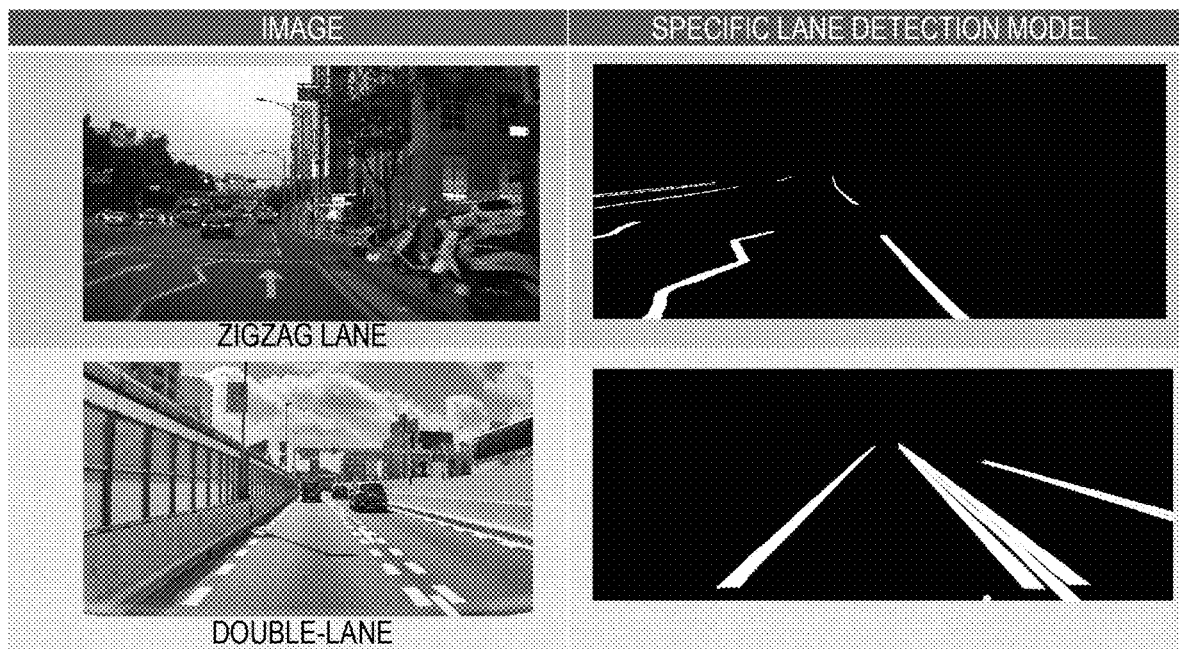
FIG. 4B is a drawing schematically illustrating a result of lane detection using a specific lane detection model, in different lane environments, in accordance with one example embodiment of the present disclosure.

As one example, FIG. 4A is a drawing schematically illustrating results of lane detection using a general lane detection model in different lane environments according to the prior art and FIG. 4B is a drawing schematically illustrating results of lane detection using a specific lane detection model according to the present disclosure in different lane environments in accordance with the present disclosure.

More specifically, FIG. 4A is illustrating results of lane detection on an image of a zigzag lane and on an image of a double-lane using the general lane detection model, which is a lane detection model according to the prior art.

On the other hand, FIG. 4B is illustrating results of lane detection on the image of the zigzag lane on the image of the double-lane using the specific lane detection model. Herein, the specific lane detection model is a lane detection model according to the present disclosure.

According to FIG. 4A, the lane detection results using the general lane detection model are difficult to be used by the labelers for the labeling tasks, since the lane detection results using the general lane detection model cannot detect accurate lane depending on the lane environment in the image, that is, the type of the lane. On the other hand, according to FIG. 4B, accurate lane detection results of the specific lane detection model selected depending on the lane environment can be used for the lane labeling tasks, since the labeler may directly check the lane detection results and select the specific lane detection model which is able to detect accurate lane depending on the lane environment in the image. Therefore, the difficulty of lane detection varying on the image can be minimized.

Next, referring to FIG. 2 again, in response to acquiring information on two or more points, e.g., first point information to k-th point information, on a specific lane selected to label the specific lane among one or more lanes located in the target image through the labeling interface, the server 1000 may allow a semi-auto labeling module to generate a first spline model having m spline points, which are two or more spline points, corresponding to the specific lane in the target image by referring to at least part of the first point information to the k-th point information acquired through the labeling interface, a segmentation map and a clustering map corresponding to a specific lane detection result of the specific lane detection model, and to display the first spline model through the labeling interface, to thereby provide the auto labeling assistance service at a step of S130. Herein, the segmentation map is generated by performing segmentation process on one or more lanes detected from the target image through the specific lane detection model, and the clustering map is a map generated by performing clustering process on the one or more lanes based on whether there are identical lanes among the one or more lanes. Herein, the spline model may be a graphical representation of a spline curve to represent the lane(s).

As an example, the process of providing the auto labeling assistance service to generate the training data through the semi-auto labeling module is described by referring to FIGS. 5A to 5G as follows.

Figure 5A:
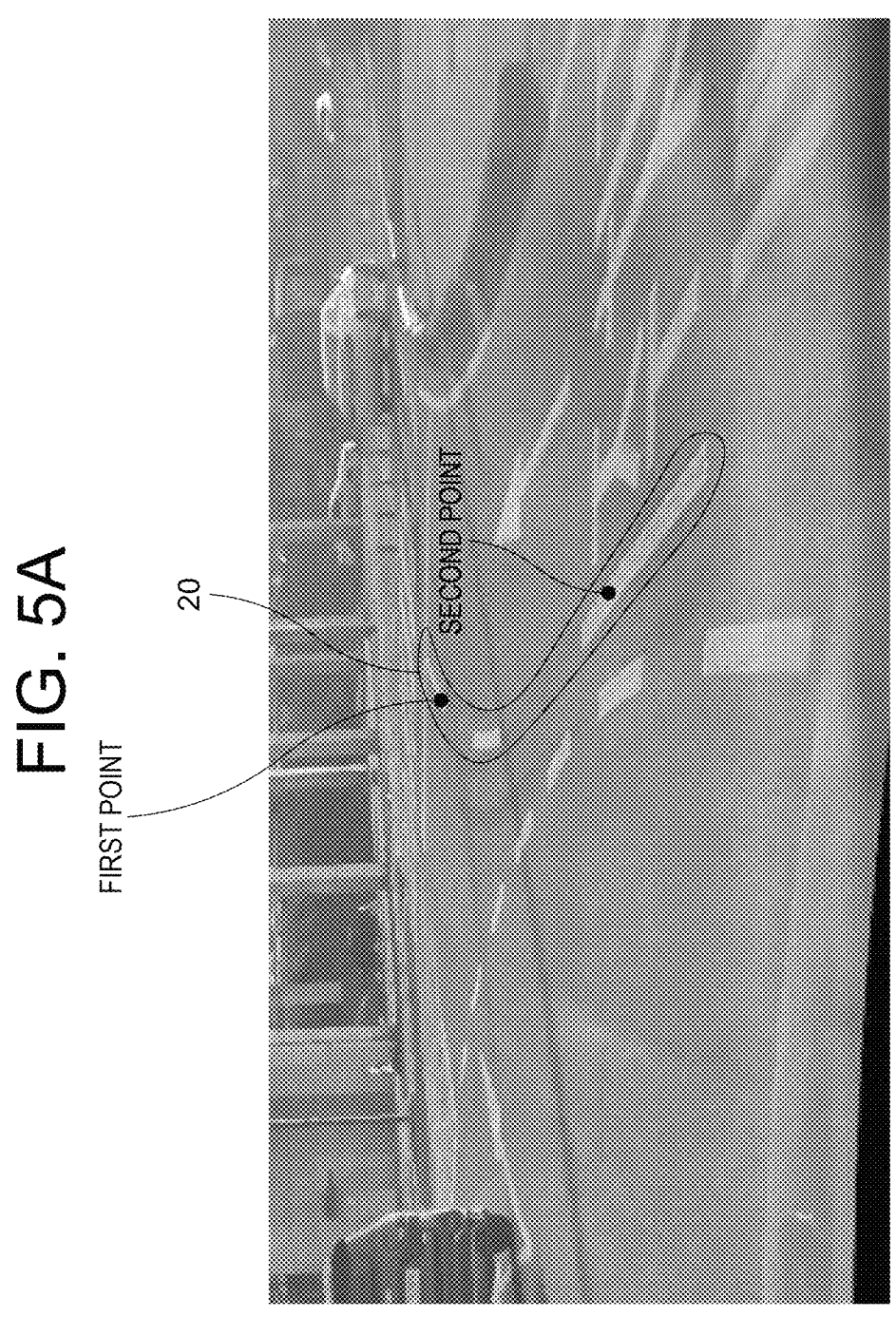
FIGS. 5A to 5G are drawings schematically illustrating processes of providing the auto labeling assistance service through semi-auto labeling in a method for providing the auto labeling assistance service to generate the training data in accordance with one example embodiment of the present disclosure.

As shown in FIG. 5a, the labeler may select a first point and a second point on a specific lane 20 to label the specific lane 20 among the one or more lanes in the target image.

Figure 5B:
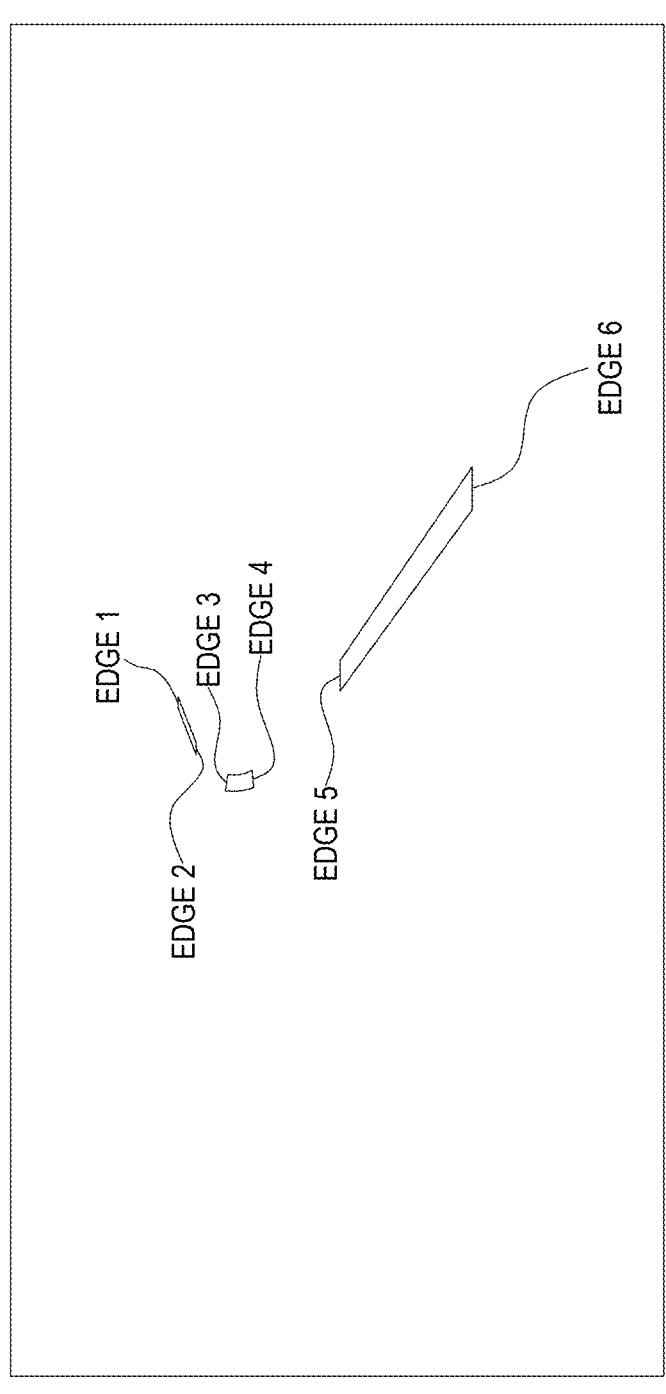

Then, as shown in FIG. 5B, the server 1000 may allow the semi-auto labeling module to cluster edges of one or more lane segments for the specific lane of the target image by using a feature map generated by referring to at least part of the segmentation map and the clustering map according to the specific lane detection result of the specific lane detection model. Herein, the edges may represent at least part of both ends of lane directions in the lane segments. That is, the server 1000 may allow the semi-auto labeling module to perform a clustering operation (not shown) on edge 1 to edge 6, which are edges of the lane segments having identical lane direction in the feature map. Although an actual lane direction for the edges 1 & 2, an actual lane direction for the edges 3 & 4, and an actual lane direction for the edge 5 & 6 are different with one another, the lane segment related to the edges 1 & 2, the lane segment related to the edges 3 & 4, and the lane segment related to the edge 5 & 6 can form a part of a smooth curve and thus the edges 1 & 2, the edges 3 & 4, and the edge 5 & 6 can be regarded as having an identical lane direction.

Figure 5C:
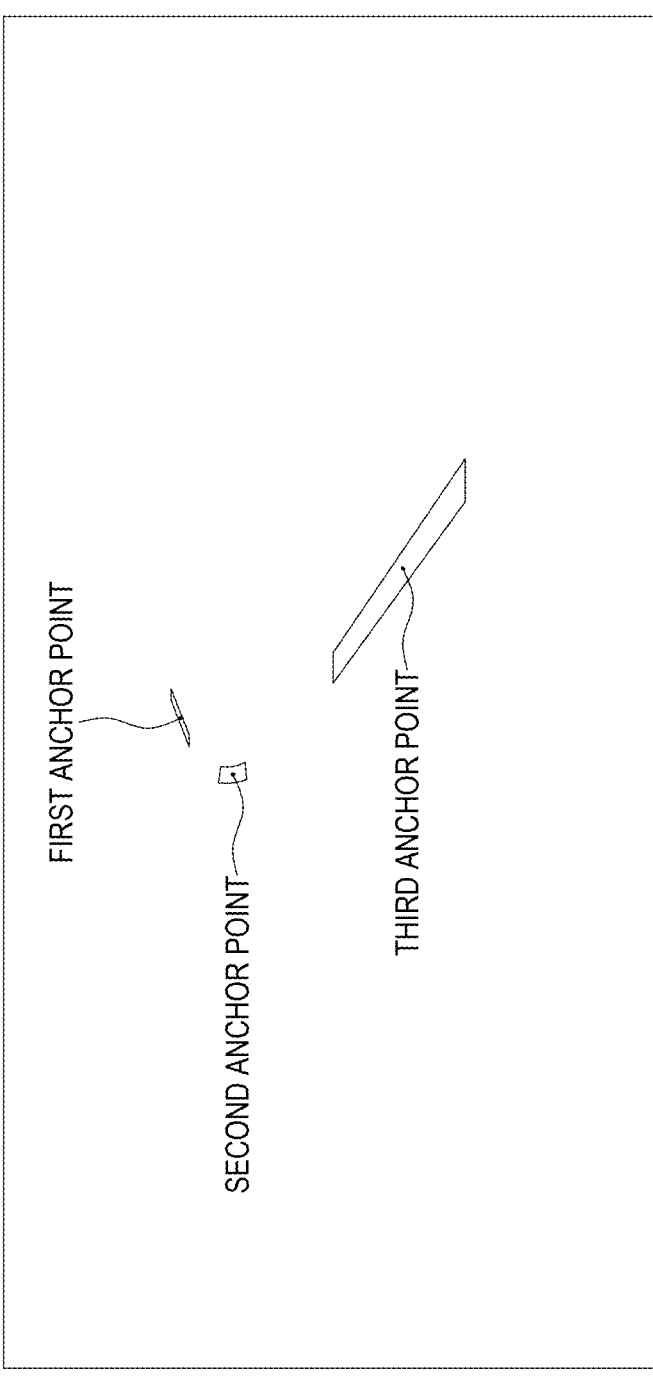

In addition, as shown in FIG. 5C, the server 1000 may allow the semi-auto labeling module to generate at least two anchor points to be used for connecting the lane segments. For reference, although one anchor point is generated in each of the three lane segments in FIG. 5C, the present disclosure is not limited to this configuration. In the present disclosure, the anchor points may be generated to have uniform distances therebetween according to the lane direction of the specific lane acquired by the lane edge clustering, or the anchor points may be generated by using grid cells corresponding to the specific lane. As mentioned above, the term "lane direction" is conceptually represented as a single lane direction (i.e., a direction related to the same lane), even though physically the lane direction (i.e., vector direction) changes with position, for example, in the case of curved lanes.

Figure 5D:
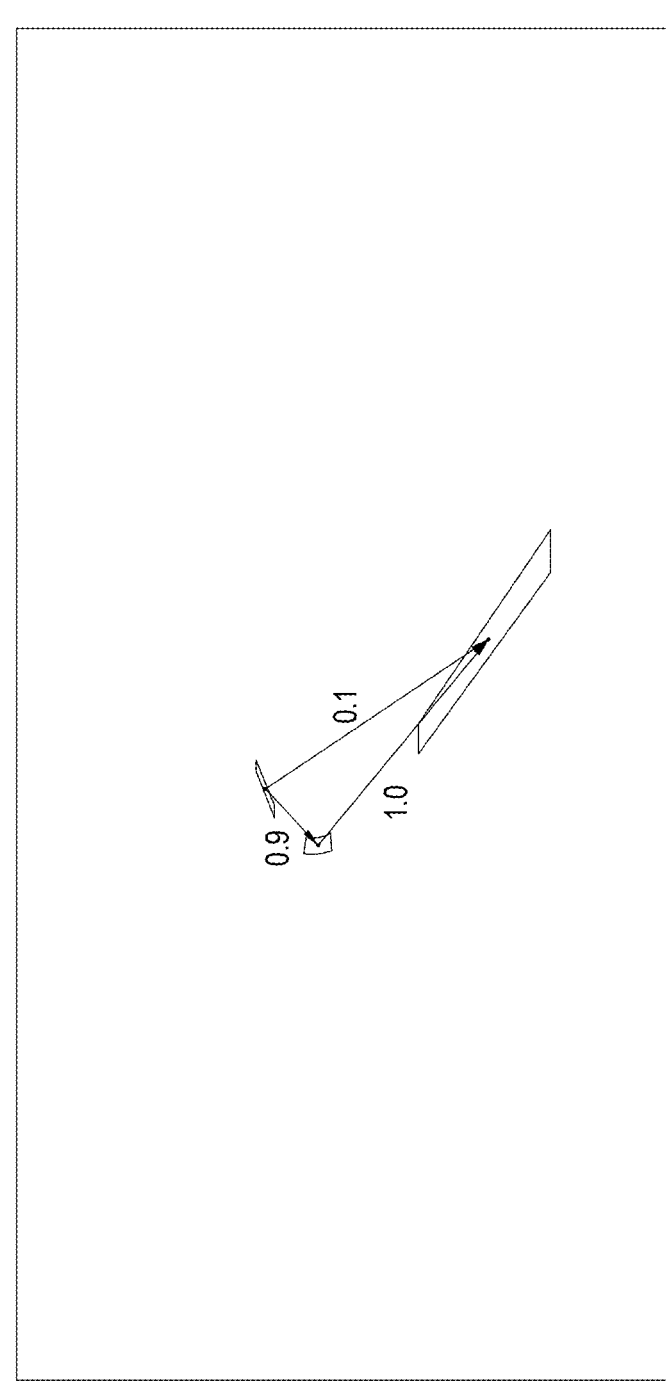

Thereafter, as shown in FIG. 5D, the server 1000 may allow the semi-auto labeling module to generate a graphical model for connecting the lane segments. Herein, the graphical model is a visualized form of probabilities of spaced-apart lane segments being connected with each other, and the graphical model may be a probabilistic model representing which of the spaced-apart lane segments should be connected to each other. For reference, in FIG. 5D, a graphical model for three lane segments are schematically illustrated. FIG. 5D illustrates an example of the lane segments where a probability of a top lane segment connecting to a middle lane segment is 0.9, a probability of the top lane segment connecting to a bottom lane segment is 0.1, and a probability of the middle lane segment connecting to the bottom lane segment is 1.0.

Figure 5E:
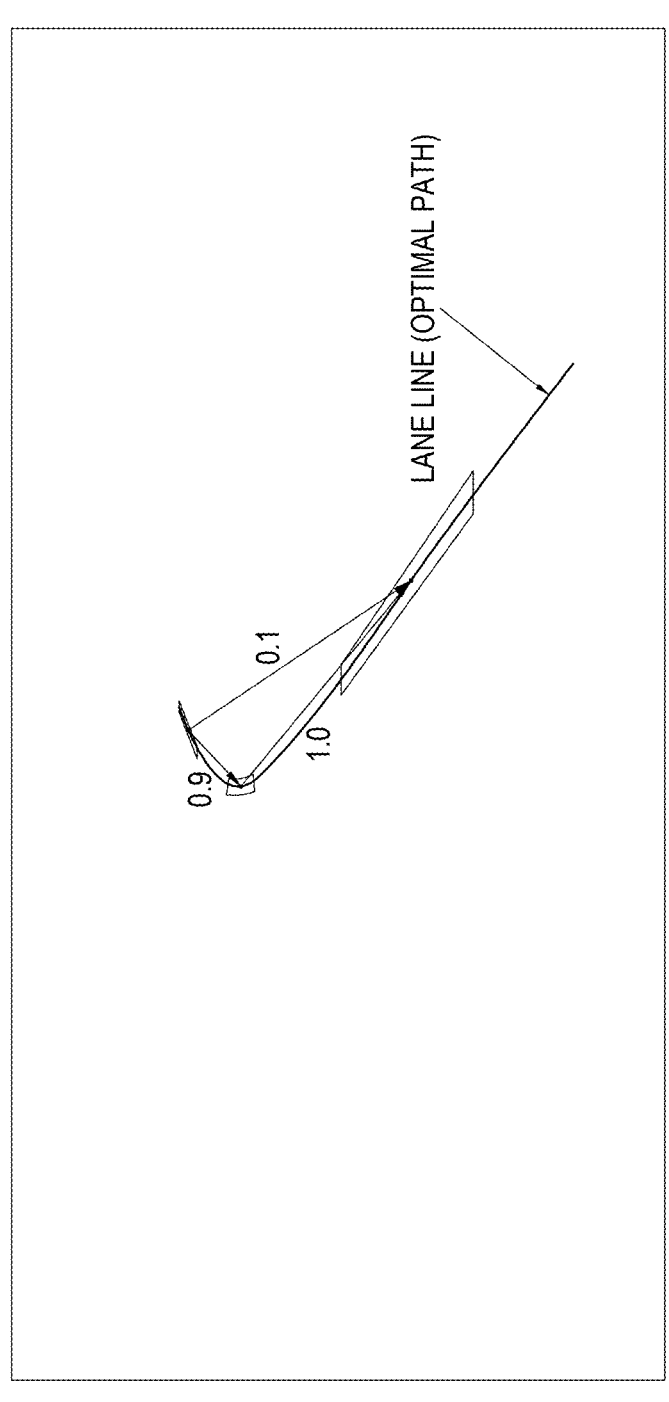

Further, as shown in FIG. 5E, the server 1000 may allow the semi-auto labeling module to determine an optimal path for connecting the lane segments by referring to the graphical model. Herein, when determining the optimal path for connecting the lane segments by referring to the graphical model, the semi-auto labeling module may determine the optimal path according to connection scores of the lane segments, i.e., connection probabilities, in the graphical model by using an A* algorithm. For reference, in FIG. 5E, since the probability of the top lane segment connecting to the middle lane segment is 0.9 and the probability of the top lane segment connecting to the bottom lane segment is 0.1, the top lane segment may be determined to be connected to the middle lane segment, and the middle lane segment may be determined to be connected to the bottom lane segment with the probability of 1.0. Therefore, the optimal path in FIG. 5E may be determined as a path connecting the top lane segment, the middle lane segment and the bottom lane segment in the order thereof. In addition, although not shown in the Figures, if it is assumed that one top lane segment is detected and lane segments of a double-lane is detected directly below the top lane segment, a process of determining which lane segment among the double-lane corresponds to the top lane segment may be performed in a similar way as above.

Figure 5F:
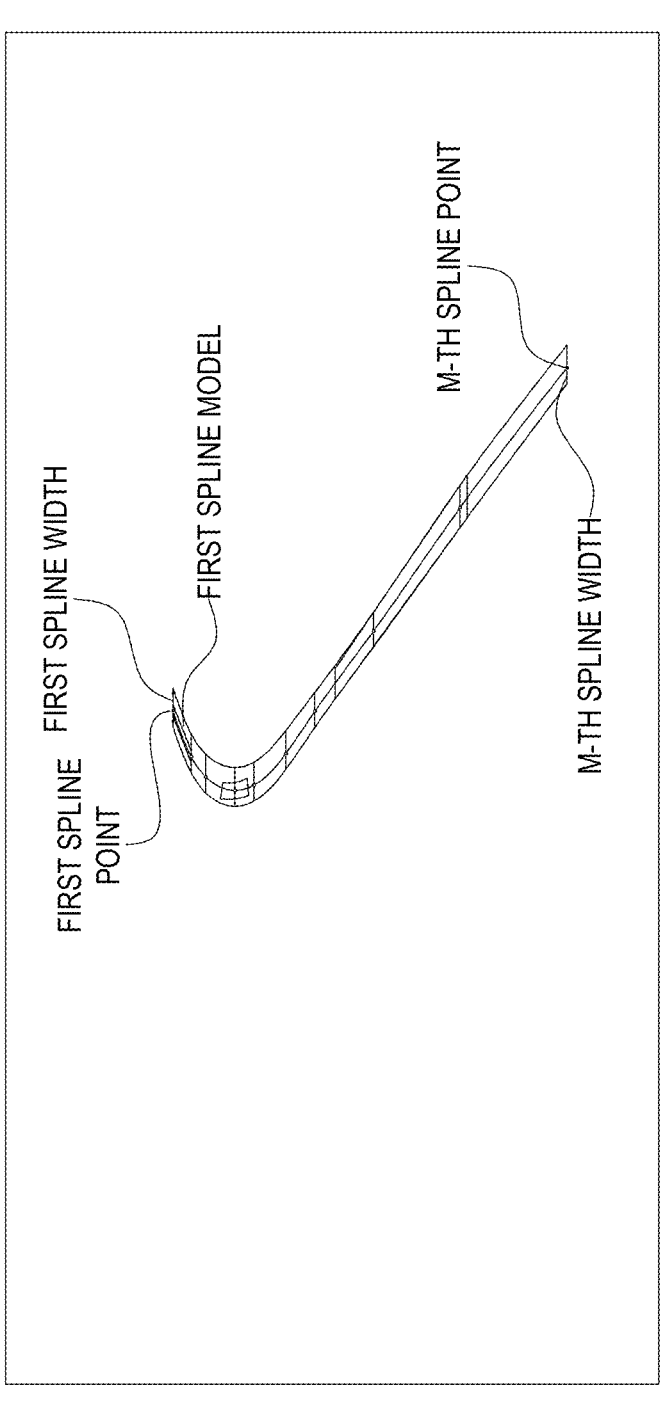

Thereafter, as shown in FIG. 5F, the server 1000 may allow the semi-auto labeling module to determine the m spline points and their corresponding m spline widths for generating splines for the lane segments through the meta-heuristic algorithm, to thereby generate the first spline model having the m spline points.

Herein, the server 1000 may allow the semi-auto labeling module to determine the m spline points and the m spline widths by using a firefly algorithm as the meta-heuristic algorithm.

In other words, in order to generate the spline model from the optimal path, the server 1000 may allow the semi-auto labeling module to determine (i) an optimal quantity of the splines for optimizing a shape of the spline model and (ii) each of the spline widths, by using the firefly algorithm, to thereby generate the first spline model.

Therefore, the server 1000 may provide the auto labeling assistance service through the semi-auto labeling module, to thereby allow the labeler to perform the labeling tasks with minimum input.

Next, referring to FIG. 2 again, in response to detecting that the m spline points for the first spline model are adjusted to m' spline points, wherein m' is an integer larger or smaller than m, by the labeler to optimize the first spline model displayed through the labeling interface, the server 1000 may allow a line pose regression module to generate a second spline model having the m' spline points by regressing a shape of the first spline model and display the second spline model through the labeling interface, to thereby provide the auto labeling assistance service at a step of S140.

That is, the server 1000 may allow the line pose regression module to optimize, through a meta-heuristic optimization algorithm, pose coefficients of the first spline model and width coefficients of the first spline model at each of the m' spline points, by referring to at least part of an edge map, a gradient map and a magnitude map corresponding to the target image, to thereby generate the second spline model with spline poses and spline widths determined at a domain of the target image, which is localized to the target image, i.e., different from the specific lane detection result corresponding to the specific lane detection model.

Herein, the server 1000 allows the line pose regression module to generate, through a Nelder-Mead algorithm which is the meta-heuristic optimization algorithm, each piece of optimized position information and each of optimized spline widths for each of the m' spline points on a parameter map which refers to at least part of the edge map, the gradient map and the magnitude map, wherein each of the m' spline points follows function values that minimize cubic polynomial coefficients according to the pose of the first spline model and a linear polynomial coefficient according to the spline width of the first spline model, to thereby generate the second spline model localized to the target image.

As an example, an x-coordinate in the first spline model, the pose coefficient (S) and the width coefficient (W) of the first spline model for the spline width can be represented as follows.

$$S_i(t)=[C_{i0},C_{i1},C_{i2},C_{i3}], W_i(t)=[C_{i0},C_{i1}]$$

Herein, i may represent index representing each of the m' spline points, t may represent y-coordinates of each of the m' spline points, $C_{i0}$ may represent an intercept, $C_{i1}$ may represent a slope of a straight line, $C_{i2}$ may represent a curvature of a quadratic curve and $C_{i3}$ may represent a curvature of a cubic curve. That is, the pose coefficient may include the straight line, the quadratic curve and the cubic curve. Further, the width coefficient may be assumed to be linear to segments between the spline points.

Therefore, locations of each of the m' spline points and their corresponding spline widths may be generated, by finding an optimal solution as follows by using the Nelder-Mead algorithm.

$$C_i = \begin{bmatrix} S_i \\ W_i \end{bmatrix}, \text{ minimize } f(C_i, L)$$

Herein, L may represent feature maps $$\begin{bmatrix} E \\ G \\ M \end{bmatrix},$$

E may represent an edge map generated from the target image, G may represent a gradient map generated from the target image and M may represent a magnitude map generated from the target image.

As such, the server 1000 may provide the auto labeling assistance service through the line pose regression according to interaction with the labeler, to thereby allow the labeler to easily optimize the first spline model, which is semi-automatically labeled, to the target image.

In other words, the labeler may check whether the semi-auto labeled first spline model exactly matches the lane in the target image, and in case the first spline model does not exactly match the lane in the target image, the number of spline points may be increased or decreased. Accordingly, the server 1000 may display the first spline model according to the increase or decrease of the number of spline points to the labeler without depending on the semi-auto labeling algorithm, by using a different algorithm from the semi-auto labeling algorithm, to thereby allow the labeler to directly check the result of optimizing the first spline model.

As one example, as shown in FIG. 5F, in the first spline model generated by the semi-auto labeling, spline lines in a region of the top lane segment and the middle lane segment may not accurately fit to an actual lane.

Figure 5G:
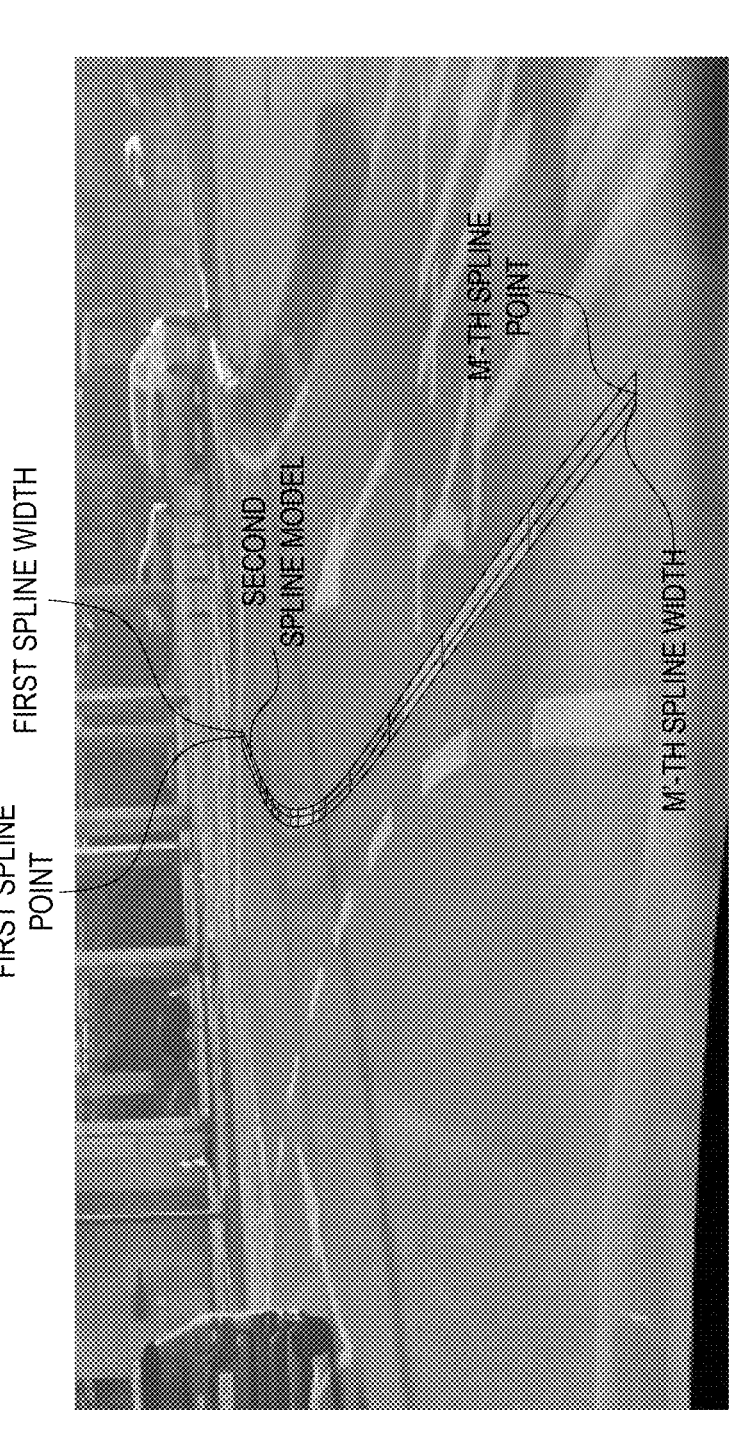

Therefore, as shown in FIG. 5G, the labeler may check whether the first spline model at an image level is an accurate fit to the actual lane, and if not, the number of spline points may be increased or decreased. Accordingly, the server 1000 may perform the line pose regression through an interaction with the labeler, to thereby generate the second spline model. Herein, the second spline model is acquired by the first spline model through an accurate fit to the actual lane at the image level.

The present disclosure has an effect of reducing time taken to perform the labeling tasks for generating the training data and improve quality of the labeling tasks, through the interaction with the labeler.

The present disclosure has another effect of minimizing the differences in the speed of the labeling tasks and the quality of the labeling tasks among labelers.

The present disclosure has still another effect of minimizing the differences in the speed of the labeling tasks and the quality of the labeling tasks among training data.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing auto labeling assistance service to generate training data, comprising steps of:

(a) in response to acquiring information on a request for the auto labeling assistance service from a labeler terminal, providing, by a server comprising a processor and a memory device, a labeling interface to the labeler terminal, the labeling interface being configured to present a first lane detection model through an n-th lane detection model to a labeler, and to receive, from the labeler terminal, a selection by the labeler of a specific lane detection model suitable for a target image among the first lane detection model to the n-th lane detection model by referring to at least one lane detection result among a first lane detection result to an n-th lane detection result, by the labeling interface displayed on the labeler terminal, wherein the first lane detection result to the n-th lane detection result are respectively acquired by applying the first lane detection model to the n-th lane detection model respectively to the target image, and wherein n is an integer equal to or larger than 1; and (b) in response to acquiring first point information to k-th point information on a specific lane selected to label the specific lane among one or more lanes located in the target image through the labeling interface, executing, by the processor, program instructions stored on the memory device to perform semi-auto labeling operations comprising generating a first spline model having m spline points corresponding to the specific lane in the target image by referring to at least part of the first point information to the k-th point information acquired through the labeling interface, a segmentation map and a clustering map corresponding to a specific lane detection result of the specific lane detection model, and to display the first spline model through the labeling interface, to thereby provide the auto labeling assistance service, wherein the first spline model is stored in a database with the target image, wherein the training data for training one or more machine learning models includes the first spline model and the target image, wherein k is an integer larger than or equal to 2, and m is an integer larger than or equal to 2.

2. The method of claim 1, further comprising a step of:

(c) in response to detecting that the m spline points for the first spline model are adjusted to m' spline points by the labeler to optimize the first spline model displayed through the labeling interface, executing, by the processor, the program instructions to perform line pose regression operations comprising generating a second spline model having the m' spline points by regressing a shape of the first spline model and display the second spline model through the labeling interface, to thereby provide the auto labeling assistance service, wherein m' is an integer larger or smaller than m.

3. The method of claim 2, wherein, at the step of (c), the line pose regression operations further comprise optimizing, through a meta-heuristic optimization algorithm, pose coefficients of the first spline model and width coefficients of the first spline model at each of the m' spline points, by referring to at least part of an edge map, a gradient map and a magnitude map corresponding to the target image, to thereby generate the second spline model which is localized to the target image.

4. The method of claim 3, wherein the line pose regression operations further comprise generating, through a Nelder-Mead algorithm which is the meta-heuristic optimization algorithm, each piece of optimized position information and each of optimized spline widths for each of the m' spline points on a parameter map which refers to at least part of the edge map, the gradient map and the magnitude map, and wherein each of the m' spline points follows function values that minimize cubic polynomial coefficients according to a pose of the first spline model and a linear polynomial coefficient according to a spline width of the first spline model.

5. The method of claim 1, wherein, at the step of (b), the semi-auto labeling operations further comprise (i) clustering edges of one or more lane segments for the specific lane of the target image using a feature map generated by referring to at least part of the segmentation map and the clustering map, wherein the edges represent at least part of both ends of lane directions in the lane segments, (ii) generating at least two anchor points for connecting the lane segments, (iii) generating a graphical model for connecting the lane segments, (iv) determining an optimal path for connecting the lane segments by referring to the graphical model and (v) determining the m spline points and their corresponding m spline widths for generating splines for the lane segments through a meta-heuristic algorithm, to thereby generate the first spline model having the m spline points.

6. The method of claim 5, wherein the semi-auto labeling operations further comprise determining the optimal path according to connection scores of the lane segments in the graphical model by using an A* algorithm when the semi-auto labeling operations (iv) determine the optimal path for connecting the lane segments by referring to the graphical model.

7. The method of claim 5, wherein the semi-auto labeling operations further comprise determining the m spline points and the m spline widths by using a firefly algorithm as the meta-heuristic algorithm when the semi-auto labeling operations (v) determine the m spline points and their corresponding m spline widths for generating the splines for the lane segments through the meta-heuristic algorithm.

8. The method of claim 1, wherein, at the step of (a), the server overlays each of the first lane detection result corresponding to the first lane detection model to the n-th lane detection result corresponding to the n-th lane detection model on the target image through the labeling interface, to thereby provide the labeler with each of the first lane detection result to the n-th lane detection result, and to receive, from the labeler terminal, the selection by the labeler of the specific lane detection model according to the specific lane detection result suitable for the target image.

9. The method of claim 8, wherein each of the first lane detection model to the n-th lane detection model includes at least part of: a cat's eye lane detection model, a zigzag lane detection model, a double-lane detection model, a general lane detection model, a merge/branch lane detection model and an intersection lane detection model.

10. The method of claim 1, wherein the segmentation map is a map generated by performing a segmentation process on one or more lanes detected from the target image through the specific lane detection model, and wherein the clustering map is a map generated by performing a clustering process on the one or more lanes detected from the target image through the specific lane detection model based on whether there are identical lanes among the one or more lanes detected from the target image through the specific lane detection model.

11. A server for providing auto labeling assistance service to generate training data, comprising:

at least one memory that stores instructions; and at least one processor configured to execute the instructions to perform processes of: (I) in response to acquiring information on a request for the auto labeling assistance service from a labeler terminal, providing a labeling interface to the labeler terminal, the labeling interface being configured to present a first lane detection model through an n-th lane detection model to a labeler, and to receive, from the labeler terminal, a selection by the labeler of a specific lane detection model suitable for a target image among the first lane detection model to the n-th lane detection model by referring to at least one lane detection result among a first lane detection result to an n-th lane detection result, by the labeling interface displayed on the labeler terminal, wherein the first lane detection result to the n-th lane detection result are respectively acquired by applying the first lane detection model to the n-th lane detection model respectively to the target image, and wherein n is an integer equal to or larger than 1; and (II) in response to acquiring first point information to k-th point information on a specific lane selected to label the specific lane among one or more lanes located in the target image through the labeling interface, performing semi-auto labeling operations comprising generating a first spline model having m spline points corresponding to the specific lane in the target image by referring to at least part of the first point information to the k-th point information acquired through the labeling interface, a segmentation map and a clustering map corresponding to a specific lane detection result of the specific lane detection model, and to display the first spline model through the labeling interface, to thereby provide the auto labeling assistance service, wherein the first spline model is stored in a database with the target image, wherein the training data for training one or more machine learning models includes the first spline model and the target image, wherein k is an integer larger than or equal to 2, and m is an integer larger than or equal to 2.

12. The server of claim 11, wherein the processor executes the instructions to further perform a process of:

(III) in response to detecting that the m spline points for the first spline model are adjusted to m' spline points by the labeler to optimize the first spline model displayed through the labeling interface, performing line pose regression operations comprising generating a second spline model having the m' spline points by regressing a shape of the first spline model and display the second spline model through the labeling interface, to thereby provide the auto labeling assistance service, wherein m' is an integer larger or smaller than m.

13. The server of claim 12, wherein, at the process of (III), the line pose regression operations further comprise optimizing, through a meta-heuristic optimization algorithm, pose coefficients of the first spline model and width coefficients of the first spline model at each of the m' spline points, by referring to at least part of an edge map, a gradient map and a magnitude map corresponding to the target image, to thereby generate the second spline model which is localized to the target image.

14. The server of claim 13, wherein the line pose regression operations further comprise generating, through a Nelder-Mead algorithm which is the meta-heuristic optimization algorithm, each piece of optimized position information and each of optimized spline widths for each of the m' spline points on a parameter map which refers to at least part of the edge map, the gradient map and the magnitude map, and wherein each of the m' spline points follows function values that minimize cubic polynomial coefficients according to a pose of the first spline model and a linear polynomial coefficient according to a spline width of the first spline model.

15. The server of claim 11, wherein, at the process of (II), the semi-auto labeling operations further comprise (i) clustering edges of one or more lane segments for the specific lane of the target image using a feature map generated by referring to at least part of the segmentation map and the clustering map, wherein the edges represent at least part of both ends of lane directions in the lane segments, (ii) generating at least two anchor points for connecting the lane segments, (iii) generating a graphical model for connecting the lane segments, (iv) determining an optimal path for connecting the lane segments by referring to the graphical model and (v) determining the m spline points and their corresponding m spline widths for generating splines for the lane segments through a meta-heuristic algorithm, to thereby generate the first spline model having the m spline points.

16. The server of claim 15, wherein the semi-auto labeling operations further comprise determining the optimal path according to connection scores of the lane segments in the graphical model by using an A* algorithm when the semi-auto labeling operations (iv) determine the optimal path for connecting the lane segments by referring to the graphical model.

17. The server of claim 15, wherein the semi-auto labeling operations further comprise determining the m spline points and the m spline widths by using a firefly algorithm as the meta-heuristic algorithm when the semi-auto labeling operations (v) determine the m spline points and their corresponding m spline widths for generating the splines for the lane segments through the meta-heuristic algorithm.

18. The server of claim 11, wherein, at the process of (I), the processor overlays each of the first lane detection result corresponding to the first lane detection model to the n-th lane detection result corresponding to the n-th lane detection model on the target image through the labeling interface, to thereby provide the labeler with each of the first lane detection result to the n-th lane detection result, and to receive, from the labeler terminal, the selection by the labeler of the specific lane detection model according to the specific lane detection result suitable for the target image.

19. The server of claim 18, wherein each of the first lane detection model to the n-th lane detection model includes at least part of: a cat's eye lane detection model, a zigzag lane detection model, a double-lane detection model, a general lane detection model, a merge/branch lane detection model and an intersection lane detection model.

20. The server of claim 11, wherein the segmentation map is a map generated by performing a segmentation process on one or more lanes detected from the target image through the specific lane detection model, and wherein the clustering map is a map generated by performing a clustering process on the one or more lanes based on whether there are identical lanes among the one or more lanes.

* * * * *